Sept. 27, 1955 W. J. TAMMINGA 2,718,985
MILK DISPENSER
Filed Aug. 4, 1954 4 Sheets-Sheet 2
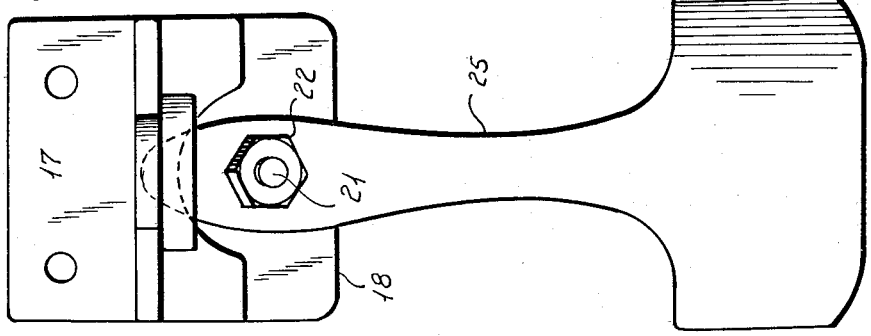
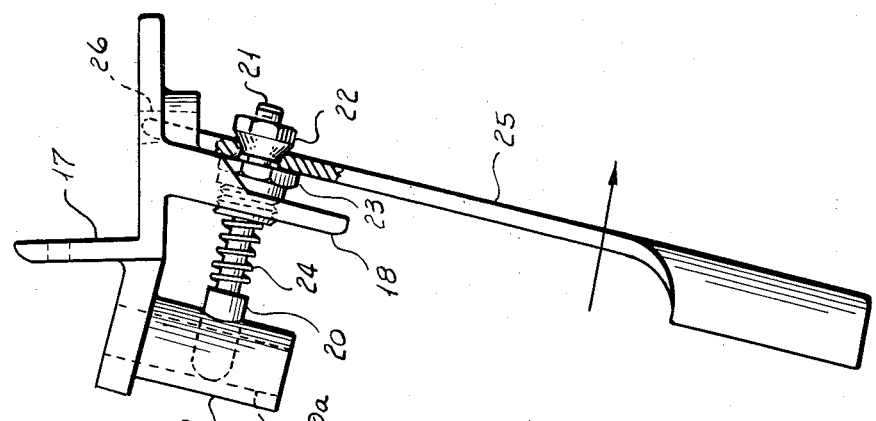
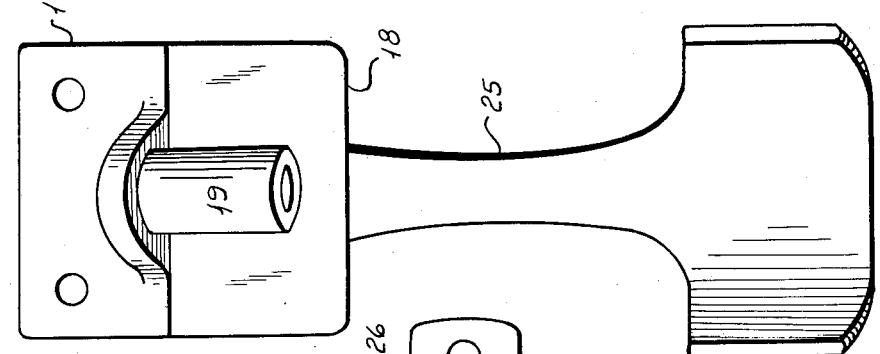
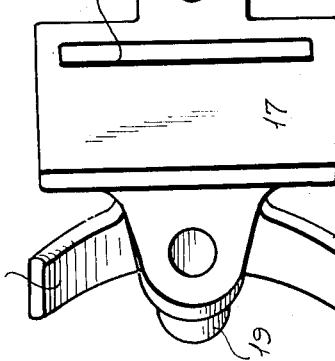
INVENTOR.
WILLIAM J. TAMMINGA
By Cornelius Fahrstue
ATTORNEY Sept. 27, 1955 W. J. TAMMINGA 2,718,985
MILK DISPENSER
Filed Aug. 4, 1954 4 Sheets-Sheet 3
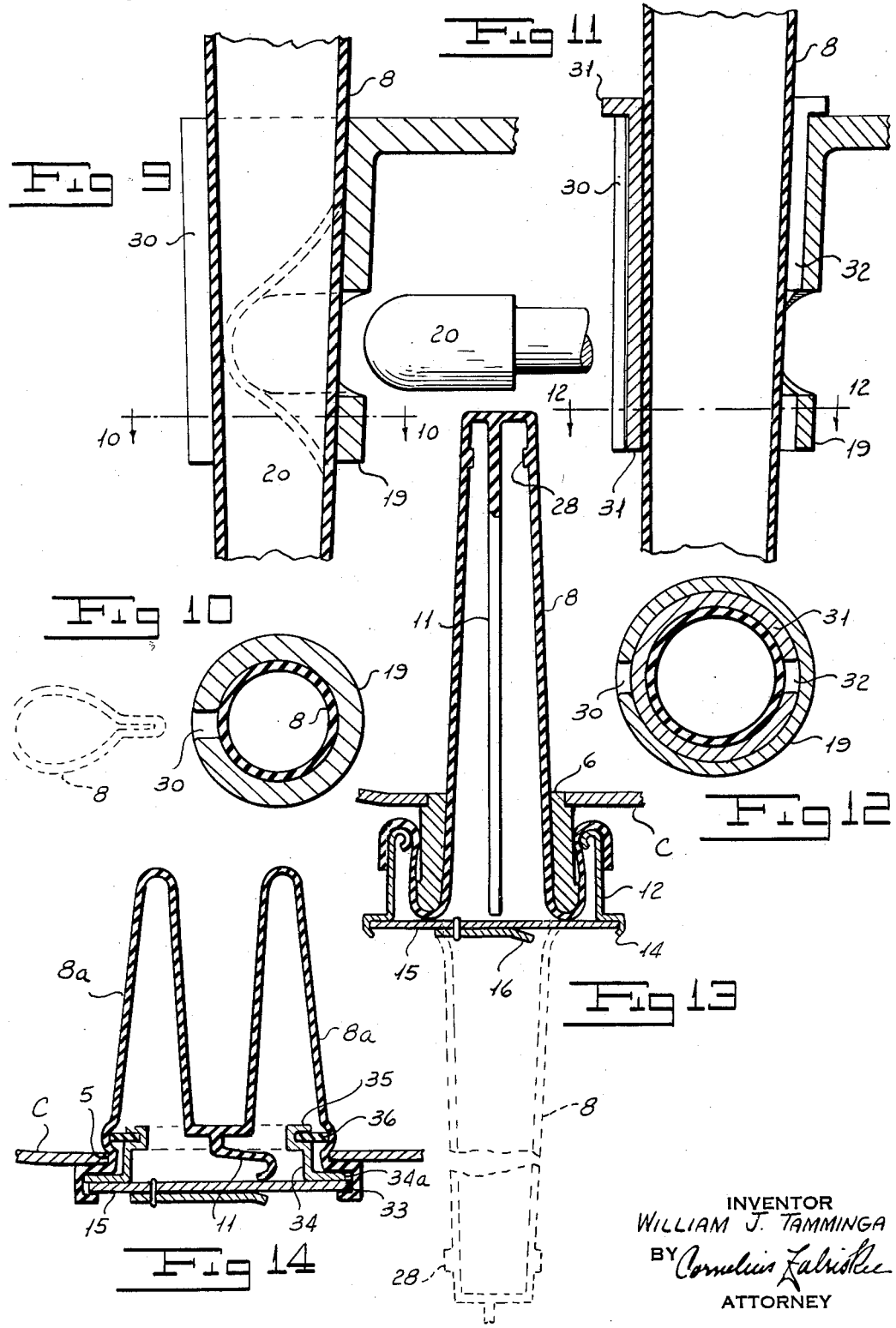
INVENTOR
WILLIAM J. TAMMINGA
BY Cornelius Zabriskie
ATTORNEY Sept. 27, 1955  W. J. TAMMINGA  2,718,985
MILK DISPENSER
Filed Aug. 4, 1954  4 Sheets—Sheet 4
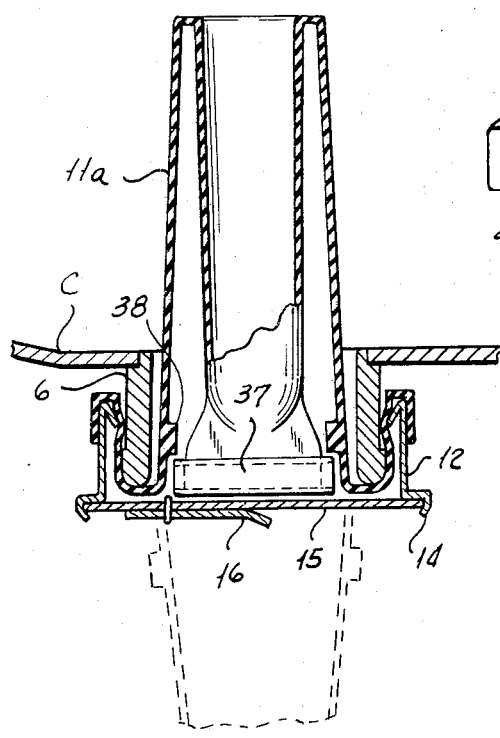
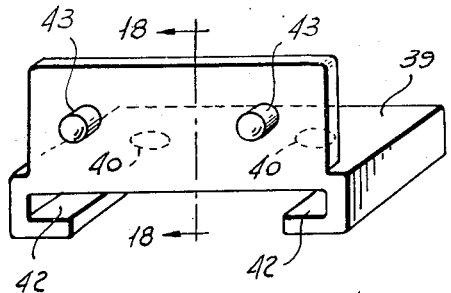
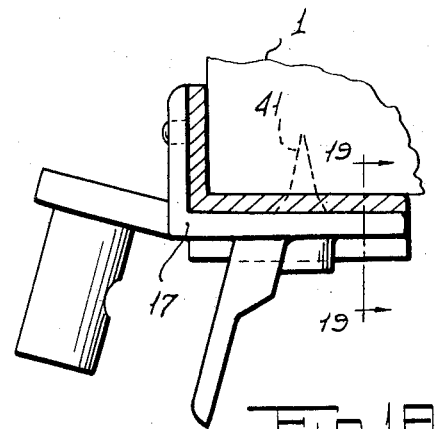
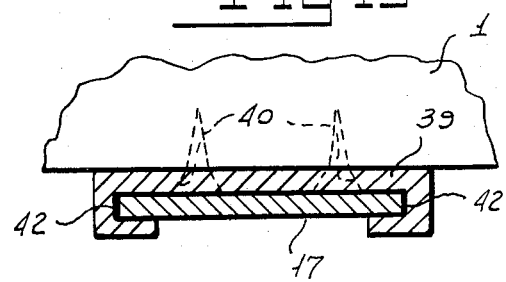
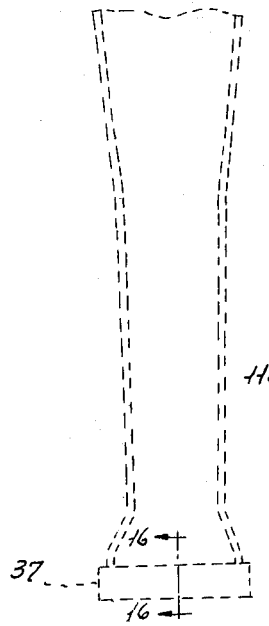
INVENTOR.
WILLIAM J. TAMMINGA
BY Cornelius Zalustee
ATTORNEY

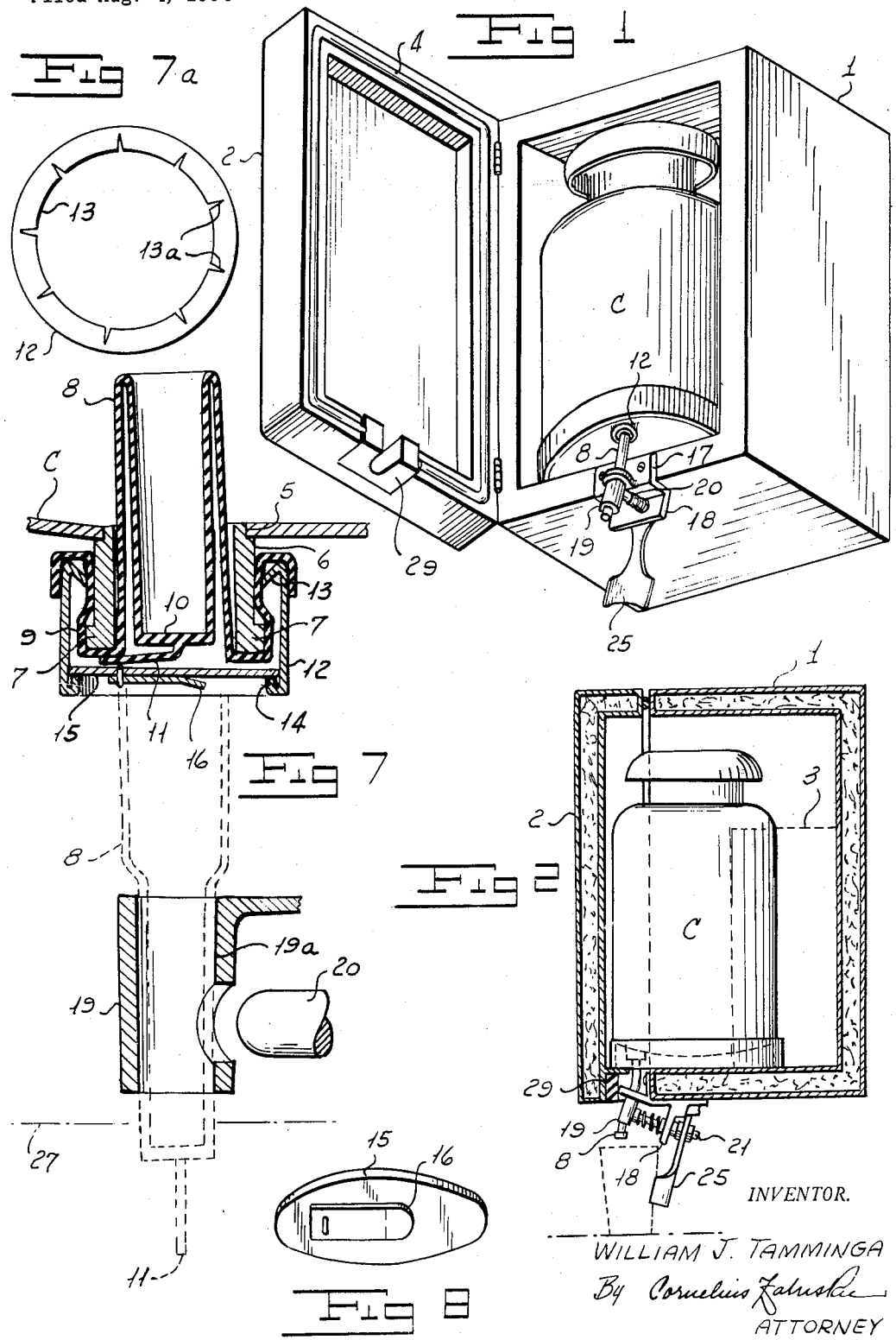

United States Patent Office 2,718,985
Patented Sept. 27, 1955

2,718,985

MILK DISPENSER

William J. Tamminga, Goshen, N. Y., assignor to Monitor Process Corporation, Jersey City, N. J., a corporation of New Jersey Application August 4, 1954, Serial No. 447,719

23 Claims. (Cl. 222—131)

This invention is a milk dispenser and is adapted more particularly for use in the dispensing of milk by the tumbler or pitcherful from a milk delivery can, a practice quite common in restaurants, cafeterias and in other similar places where food or drink is served. The devices whereby this is accomplished generally comprise a refrigerated cabinet adapted to contain a milk delivery can of the 20 or 40 quart variety. The can is provided with an outlet through which the milk may be delivered through a delivery tube with which is associated appropriate valve mechanism to control the flow of milk as and when desired into a tumbler or pitcher held below the delivery tube. Most of these dispensing devices now in use involve the employment of a rigid delivery tube although some provide for the delivery of milk from the can through a flexible tubing connected to an outlet on the can and adapted to be associated with valvular mechanism mounted on the cabinet. The present invention is particularly directed to the latter type of apparatus but involves many improvements therein.

All apparatus which has heretofore employed a flexible delivery tube has been open to many objections. The tube is commonly in the form of a relatively long pipe of relatively small diameter. Such a tube is difficult to properly clean and sterilize and is, moreover, generally attached to a tube on the bottom of the can and coiled within a recess in the bottom of such can and held in place therein by clips attached to the peripheral wall of that recess. Ordinarily, the tube is delivered to the creamery in double the length required for any particular can and it is the practice to cut the tube in half prior to its attachment to the can and use the two halves of the tube on successive cans. A tube of this character cannot be internally sterilized after the ends of the tube are sealed and if sterilized before the ends are sealed, impurities are apt to enter the tube before or during the sealing operation. Moreover, the tube is exposed at the bottom of the can during shipment and is thus not only apt to be broken but tends to accumulate dirt or filth as it is moved from place to place.

Moreover, the tube must be brought into cooperation with the control valve on the cabinet after the can has been placed in the cabinet. Under such conditions, the constricted spaces for manipulation provided in prior devices makes it difficult to remove the tube from the clips in the recess at the bottom of the can and to bring the tube into cooperative relation with the dispensing valve.

The object of the present invention is to provide a thoroughly satisfactory, economical and sanitary dispenser wherein all parts may be thoroughly cleaned and sterilized and wherein the flexible outlet is, prior to filling the can, positioned within the confines of the can and sealed at the exterior of the can, so that it is kept thoroughly sterile from the time it is attached to the can and the can is filled with milk at the creamery until the time the seal is removed and the flexible outlet is withdrawn for cooperation with the dispensing valve. In fact, the construction is such that the flexible outlet of this invention may be properly sterilized in place on the can and there is no prior known construction embodying a flexible outlet wherein this can be satisfactorily accomplished.

An important feature of this invention resides in the particular construction of the cabinet in which the can is positioned and the placement of the can within the cabinet together with the corresponding placement and structure of the dispensing valve mechanism which makes it extremely easy to withdraw the flexible outlet from the can and associate it with the dispening mechanism in a simple, convenient and efficient manner.

Another important feature of this invention resides in the novel manner in which the cabinet is sealed at the dispensing zone against the loss of refrigeration from the interior of the cabinet at this point. This loss of refrigeration has been a serious problem in the past but is entirely solved by the present invention.

The invention thus embodies numerous features of novelty and improvement over prior art attempts to provide entirely satisfactory and sanitary means for the dispensing of fluid milk from a bulk milk container such as the conventional milk delivery can.

Another important feature of this invention resides in the fact, that instead of the usual long tube of small internal diameter for the discharge of the milk in the can, I employ a flexible nipple of entirely different form and shape, so constituted that it may be sealed within the confines of the can and within the milk therein, from the time the milk is introduced into the can until the can is placed in the dispensing cabinet. This nipple is so constructed that, when the can is in the cabinet, the nipple, which up to that time has been covered and protected by a dust seal, may be uncovered by removal of the seal and the nipple thereupon withdrawn from the interior of the can and brought into cooperative relation with the dispensing mechanism on the cabinet. The nipple which I employ has a normally sealed end which is adapted to be cut off after it has been placed in cooperation with the dispensing mechanism, so that milk may be dispensed therethrough. An important feature of this nipple is that it may be sterilized in place on the can and it provides for a complete sealing of the can at this point until the milk is to be dispensed.

Features of the invention, other than thos adverted to, will be apparent from the hereinafter detailed description and appended claims, when read in conjunction with the accompanying drawings.

The accompanying drawings illustrate different practical embodiments of the invention, but the constructions therein shown are to be understood as illustrative, only, and not as defining the limits of the invention.

Fig. 1 is a perspective view of the milk dispensing cabinet embodying the present invention shown with a milk delivery can in novel dispensing position therein and associated with dispensing mechanism embodying this invention.

Fig. 2 is a central vertical section through the structure shown in Fig. 1 with the cabinet door closed.

Fig. 3 is a side elevation of the dispensing valve and its controlling mechanism.

Fig. 4 is a front view of the structure shown in Fig. 3.

Fig. 5 is a back view thereof.

Fig. 6 is a top view thereof.

Fig. 7 is a vertical fragmental section taken radially of the can as it appears in Fig. 1 and extending through the milk delivery nipple and through the control valve, a portion of which is shown in this view, the cabinet being omitted.

Fig. 7A is a plan view of a holding sleeve shown in Fig. 7.

Fig. 8 is a perspective view of a sealing element shown in Fig. 7.

Fig. 9 is a vertical section showing a modified form of dispensing mechanism with a dispensing tube therein.

Fig. 10 is a section on the line 10—10 of Fig. 9.

Fig. 11 is a view like unto Fig. 9, but showing a further modified form of construction.

Fig. 12 is a section on the line 12—12 of Fig. 11.

Fig. 13 shows a modified form of delivery tube in central section.

Fig. 14 is a central section showing another modified form of tube.

Fig. 15 is a view similar to Fig. 13, but showing a further modified form of the invention.

Fig. 16 is a fragmental section on the line 16—16 of Fig. 15.

Fig. 17 is a perspective view showing a holder which may be employed to detachably support the dispensing mechanism.

Fig. 18 is a section on the line 18—18 of Fig. 17, showing the dispensing mechanism engaged with the holder and in elevation.

Fig. 19 is a section on the line 19—19 of Fig. 18.

Referring to the drawings, and more particularly to Figs. 1-8 inclusive, 1 designates a body of a refrigerated cabinet provided with a door 2. The cabinet body, as well as the door, are of double walled construction with intermediate heat insulating material after the manner of an ice chest or refrigerator, so that, when the interior of the cabinet is refrigerated, heat absorption from its exterior will be minimized.

The cabinet is so constructed that, when a milk delivery can C is positioned in the cabinet, it will not be entirely received within the body 1 thereof, but will project a distance beyond the front of the body, as shown in Figs. 1 and 2, so that the outlet, with which the bottom of the can is equipped, will be positioned beyond the front edge of the cabinet or at least so close to that edge as to be readily accessible when the door is open. Appropriate means is preferably provided for so positioning the can. Ordinarily, a refrigerating unit 3 is built into the back part of the cabinet and, as the can is placed in the cabinet, it engages with that refrigerating unit when the can comes to the position shown.

With this arrangement, an appreciable portion of the can will project beyond the front edge of the cabinet body, and accordingly the door associated with said body is of the box type, i. e., it has a front wall with a peripheral skirt sufficiently deep to permit the door to be closed tightly without engagement thereof with the can C. A gasket 4 extends about the greater portion of the free edge of the skirt and resiliently engages the front edge of the body 1 to form a hermetic seal therewith.

In adapting a conventional milk delivery can C for use with this invention, the bottom thereof is provided near the side wall of the can with an opening 5 (Fig. 7) in which is mounted a bushing 6. This bushing may be drawn from the bottom of the can, if desired, but for the modification of pre-existing cans, the bushing is preferably made separate and soldered, welded, brazed or otherwise firmly secured in place.

The bushing is formed near its free end with a bead 7 of any appropriate shape and with this bushing is adapted to be detachably associated a flexible outlet discharge nipple 8. This nipple is of flexible and resilient material and may vary in shape or form and may be made in various ways. However, as shown in Fig. 7, it has an elongated tubular section, the base end of which may be returned upon itself, as at 9, to overlie and embrace the exterior of the bushing 6, as shown in Fig. 7, while the remainder of the nipple is normally folded back upon itself intermediate its ends, as shown in this figure. The latter end of the nipple is closed, as shown at 10, and is provided with an external appendage 11.

After the tube has been applied to the bushing, as shown in this figure, it is adapted to be locked in place by forcing thereover a protective sleeve 12 of such internal diameter as to grip the returned portion 9 of the nipple and thus secure the nipple to the bushing. To insure this, the upper end of the sleeve 12 may be provided with an internal resilient flange 13a notched as shown at 13b in Fig. 7A. This flange may be forced into place over the bead 7 to cause the returned end of the nipple to be gripped firmly against inadvertent removal from the bushing. However, the sleeve may be withdrawn at the creamery when sufficient force is applied thereto by an appropriate tool in order that the nipple may be changed, for this nipple is designed for single use only, i. e., to be used only once and is replaced each time the can C is refilled at the creamery.

The outer end of the sleeve 12 is turned back upon itself to form a shoulder 14 adapted to support a sealing member 15. This sealing member may be of the type commonly used on individual milk bottles and is shown as provided with a tab 16, so that it may be readily withdrawn after the can has been placed in the cabinet and milk is to be dispensed.

In Fig. 7, the nipple is shown as telescoped upon itself within the bushing and the can, although this is not necessary. It may be left untelescoped, as in Fig. 13, so that the full length of the nipple may extend in an upward direction into the interior of the can, but in that case, the appendage should be made sufficiently long so as to be easily reached when the dust seal 15 is removed.

In either case, the can is positioned within the cabinet, as shown in Figs. 1 and 2, and after this has been done, the tab 16 may be conveniently grasped to remove the sealing disk 15. This exposes the appendage 11 and it is a simple matter for the operator to grasp that appendage and, by exerting a downward pull thereon, withdraw the discharge nipple from the can into the dotted line position shown in Fig. 7 and into cooperative relation with the dispensing mechanism next to be described.

The dispensing mechanism is best shown in Figs. 4-6, inclusive, as embodying a right angle fixture 17 provided with a downwardly inclined flange 18. At the front of this fixture is formed a similarly inclined tubular boss 19 through which the lower portion of the withdrawn nipple 8 is adapted to project, as shown in dotted lines in Fig. 7. The passage 19a through the boss is downwardly tapered to conform to the taper of the nipple so that said nipple may snugly seat therein against creeping in either direction. In the back of the boss is formed an opening through which a plug 20 of a pinch valve is adapted to operate. This plug has a reduced stem 21 which extends rearwardly through the flange 18 and is threaded at its rear end to receive a nut 22. The stem 21 operates for free sliding movement through a bushing 23 which is tapped into the flange 18 and a spring 24 normally impels the plug valve 20 into the position shown in dotted lines in Fig. 3, so as to grip and pinch that portion of the nipple which extends through the boss 13 and thus serves therewith as a pinch-cock to shut off the flow of milk through such nipple, when the end of the latter is cut away as hereinafter described.

Back of the flange 18, the stem 21 extends through an enlarged hole in an actuator 25 and the upper end of this actuator projects into a slot 26 in a fitting 17. There is thus established a relatively loose connection between the actuator 25 and the stem 21, so that, when the actuator is forced in the direction of the arrow in Fig. 3, the plug 20 may be withdrawn from the boss 19 and allow the flow of milk through the nipple. During this operation, the wall of the slot 26 serves as a fulcrum for the actuator.

The fitting 17 is mounted on the cabinet, as shown in Figs. 1 and 2, so that the boss 19 projects beyond the face of the body 1 and slightly forward of the outlet of the can. The boss 19 is sufficiently below the can to leave plenty of room for an operator to reach in between the bushing and the can to remove the dust seal 15, withdraw the nipple and pass its lower end through the boss 19. During the passage of the nipple through the bushing, the actuator should be retracted to withdraw the plug 20 which may be released as soon as the nipple is in the dotted line position of Fig. 7.

The lower end of the nipple is then cut off along the line 27 and to insure that the cut be made at the proper place, the nipple may be provided with an integral collar 28, as shown in Fig. 13, across the lower edge of which the cut is made, but this is not necessary. Although the end of the nipple has been cut off, the plug valve 20 will collapse the nipple and seal the same against the flow of milk therethrough until the actuator 25 is forced to the right in Fig. 3, either by the operator's hand or by engagement of a tumbler therewith. This movement of the actuator will retract the plug valve and milk will flow into the tumbler until the tumbler is full, whereupon withdrawal of the tumbler or disengagement of the hand with the actuator will permit the spring 24 to return the plug valve in shut off position where it will remain until the next dispensing operation.

The upright front plate of the fitting 17 may be set into the front edge of the cabinet 1, so that the front face of this fitting will be flush with the edge of the cabinet body. However, this is not necessary in accordance with this invention for I provide upon the door means which will positively seal the cabinet against the loss of refrigeration at this point. To accomplish this end, I mount within the skirt of the door a yieldable and resilient rubber or plastic sealing member 29, so shaped and positioned that, when the door is closed, it will register with, overlie and conform to all parts of the dispensing mechanism which extend beyond the front edge of the cabinet body 1 and form therewith a seal in this zone. The gasket 4 will form a tight refrigeration seal throughout the remainder of the joint between the body of the cabinet and the door.

In Figs. 9–14 of the drawings, I have shown certain modifications of the invention.

The only difference between the description hereinbefore advanced and the showing of Figs. 9 and 10 is that the forward portion of the bushing 19 is provided with a vertical slot 30. With this slot present, it is not necessary to pass the extended portion of the nipple downwardly through the bushing 19 for the nipple may be introduced into the interior of the boss 19 by collapsing said nipple, as shown in dotted lines at the left hand side of Fig. 10, and then introducing it through the slot. As soon as it has been entered, it will reassume its normal circular shape, as shown in full lines in that figure.

I may, if desired, position within the passage of the boss 19 a bushing 31, as shown in Figs. 11 and 12, and provide this bushing with a slot 32. The bushing may be rotated, so as to register the slots 30 and 32 in order that the nipple may be introduced into the bushing, as shown in Fig. 10, and, after the nipple has been thus introduced, the bushing 31 may be rotated so as to oppositely position the slots 30 and 32, as shown in Fig. 12. The bushing thus acts to seal the slot 30.

The structure shown in Fig. 13 is in many respects the same as shown in Fig. 7, except that, instead of telescoping the nipple 8, as shown in the latter figure, it is permitted to extend upright into the confines of the can. The appendage 11 in the structure of Fig. 13 should, in this instance, be made sufficiently long, so that it may be readily grasped when the dust seal 15 is removed.

In Fig. 14 a modified manner of attachment of the nipple to the can is illustrated. In this showing the nipple, designated 8a, is provided at its base with a channel portion 33 in which is adapted to be placed the radial flange 34a of a metallic ring 34, the opposite end of which ring is channeled as at 35 to receive and carry a resilient annular washer or retainer 36, the outer periphery of which is of greater diameter than the perforation in the bottom of the can. No bushing 6 is required for this nipple. In applying this type of nipple to the can, the flange 34a of the metallic ring 34 is first placed in the channel 33 and the telescoped portion of the nipple, together with the ring 34 and washer 36 are thereupon pressed through the opening in the can bottom. The washer is sufficiently resilient to permit it to be sprung through the hole in the can and, as soon as it has entered the interior of the can, it will force the wall of the nipple radially outward sufficiently to mount the nipple on the can with a liquid-tight seal between these parts. When the empty can has ben returned to the creamery, the ring and nipple may be withdrawn through the use of a suitable tool and a new nipple replaced therefor. Fig. 14 also provides for the dust seal 15, as hereinbefore described.

The structure of Fig. 15 is substantially the same as the structure shown in Fig. 7 with three exceptions. The nipple 11a, shown in Fig. 15, is illustrated as having a wall of substantially uniform thickness throughout and is shaped substantially in the form of a frustum of a cone. The tube is initially formed with both ends open and the smaller end is thereafter collapsed into flattened condition and sealed by a metal clip 37, as shown best in Fig. 16. This produces a tight seal against leakage of milk from the can and, after the tube has been brought into cooperative relation with the dispensing mechanism, the tube is severed adjacent the clip 37 to allow the discharge of milk from the can.

The walls of the tube 11a may be made quite thin and, in order to maintain the clip 37 in the position shown in Fig. 15, so that it cannot possibly withdraw into the can or move into a position where it is inconvenient to grasp the clip 37 to withdraw the tube from the can, I preferably provide an annular bead 38, as shown in Fig. 15, which overlies the clip and maintains it in accessible position, so that, when the seal 15 is removed, the clip may be easily grasped.

In Figs. 1 and 2, the dispensing mechanism is shown as mounted permanently on the cabinet. In some instances, it is desirable to be able to remove this mechanism entirely so as to facilitate the cleaning thereof. Figs. 17–19 provide means whereby this may be done.

Fig. 17 shows a holder 39 perforated at 40 for the passage of screws 41, whereby this holder may be permanently attached to the cabinet body 1. The holder is provided on its under side with opposed channel guides 42 and the lateral edges of the angle plate 17 of the dispensing mechanism are extended and are adapted to be received into these guides, as shown in Figs. 18 and 19. Pins 43 project forwardly from the holder 39 and are adapted to enter into registering perforations in the angle plate 17 to steady the operations of the dispensing mechanism and make it more rigid with the cabinet.

My dispenser, as hereinbefore described, is extremely convenient for the user and in this respect is in marked contrast to all prior constructions which use a flexible delivery tube. It is absolutely sanitary, economical to manufacture and easy to install and it overcomes all of the objections which have heretofore been raised against flexible tube dispensers. All parts which come in contact with the milk are housed during shipment of the can within the confines of the can and are sealed within these confines so that they cannot become damaged, soiled or contaminated and, when the time comes to associate the nipple with the dispensing valve, this may be done far more simply and easily than has heretofore been the case with any prior construction. Moreover, all parts of the dispensing mechanism are exposed to view for convenient cleaning and no place is provided for the lodging of bacteria or extraneous matter.

The foregoing detailed description sets forth the invention in its preferred practical forms, but the invention therein described is to be understood as fully commensurate with the appended claims.

Having thus fully described the invention, what I claim as new and desire to secure by Letters Patent is:

1. In a milk dispenser, a refrigerated cabinet comprising a cabinet body provided with an open side and adapted to receive and house the greater portion of a milk can within said body with the remaining portion of such can projecting through and beyond said open side, a dispensing mechanism mounted on said body and including a milk conduit holder positioned forwardly of the open side of the cabinet body and underlying the projecting portion of the can, and an internally recessed cabinet door normally closing the open side of the cabinet body and enclosing the projecting portion of the can.

2. A milk dispenser comprising: a refrigerated cabinet embodying a cabinet body having therein a chamber with an open front, a door for closing said open front and having an internal chamber to augment the size of the chamber of the cabinet body, a milk can positioned within the cabinet and occupying both chambers and provided in its bottom with a milk outlet positioned within the chamber of the door.

3. A milk dispenser according to claim 2, comprising a flexible conduit connected to the milk outlet of the can, and a dispensing mechanism mounted on the cabinet body beneath the can and embodying a passage forwardly of the cabinet body through which said conduit may extend, and valvular means operable upon the conduit within said passage to pinch or release said conduit.

4. A milk dispenser according to claim 3, wherein the flexible conduit comprises a flexible nipple housed within the confines of the can during shipment of the latter and provided with a closed end having an external appendage adapted to be grasped and pulled to withdraw the nipple from within the can to allow it to be brought into cooperation with the passage of the dispensing mechanism.

5. A milk can provided in its bottom with a tubular outlet, a flexible nipple having an open end secured to said outlet with the remainder of the nipple extending into the milk containing confines of the can and closed at its free end, and means exteriorly of the nipple for covering and concealing the same.

6. A milk can according to claim 5, wherein the open end of the nipple is returned upon itself over the exterior of the outlet, in combination with a sleeve embracing the returned end of the nipple to bind it to the tubular outlet, and wherein the covering and concealing means comprises a seal which may be readily withdrawn.

7. A milk dispenser comprising a cabinet adapted to contain a milk can provided with a flexible discharge conduit, and a dispensing mechanism embodying a pinchcock having a walled passage through which the conduit is adapted to extend, the side wall of said passage being provided with a slot through which the conduit may be introduced in a cross axial direction into the passage to obviate the necessity of threading the conduit through said passage.

8. A flexible nipple one end of which is closed and the other end of which has an internal peripheral channel, a rigid ring one end of which has a flange extending into the channel of the nipple and the other end of which has an external channel, and a resilient annulus in said external channel.

9. In a milk dispenser, a refrigerated cabinet comprising a cabinet body having therein a chamber with a door, a milk can positioned within the chamber of the cabinet and provided at its bottom with a flexible downwardly tapered outlet conduit, and a dispensing mechanism on the cabinet beneath the can and provided with an upright passage through which the flexible conduit is adapted to extend, said passage having a taper corresponding to the taper of that portion of the conduit which extends therethrough and of a size to fit said tapered portion of the conduit, whereby said conduit snugly seats within said passage and is thereby held against creeping.

10. A milk can provided in its bottom with a tubular outlet having an external bead spaced from the bottom of the can, a flexible nipple closed at one end and open at its other end and projecting into the confines of the can through the tubular outlet with the open end of the nipple turned back over the exterior of the tubular outlet to a point above the bead and there provided with a downwardly facing channel, and a sleeve embracing the turned back portion of the nipple with its upper end extending into the channel of the nipple and there provided with an internal resilient flange engaging with and clamping the turned back portion of the nipple to the tubular outlet, the opposite end of the sleeve being provided with an internal chanel, and a detachable seal sealing the lower end of the sleeve and peripherally projecting into the channel thereof.

11. A milk dispenser comprising: a dispensing cabinet provided at its bottom with milk dispensing mechanism, said milk dispensing mechanism being mounted for detachment from the cabinet without the aid of tools.

12. A milk dispenser comprising a refrigerated cabinet embodying a cabinet body having therein a chamber with an open front, a dispensing mechanism mounted on the cabinet and projecting beyond the open front, a door for closing the open front, said door being provided around the greater portion of its free edge with a gasket and having in the region of the dispensing mechanism a resilient flexible cushion shaped complementarily to the projecting portion of the dispensing mechanism and adapted to closely embrace the same when the door is in closed position.

13. A flexible outlet nipple larger at one end than at the other the larger end being returned upon itself to form a channel and the returned portion being also returned upon itself to form an additional channel.

14. A flexible outlet nipple according to claim 13, wherein the first channel is of greater depth than the second channel.

15. A milk dispenser comprising: a milk can having a milk containing chamber provided with a tubular outlet at its bottom, a flexible nipple the greater portion of which extends through the tubular outlet into the milk containing chamber of the can, the outer end of said nipple being open and returned upon itself over the free edge of the tubular outlet with the terminal part of said returned portion also returned upon itself, and means projecting into the latter returned portion and embracing the nipple externally of the tubular outlet to bind the nipple to said outlet.

16. A milk dispenser according to claim 15 comprising a cap enclosing the entire outer end of the nipple and detachably secured to the means for binding the nipple to said tubular outlet.

17. A milk dispenser comprising: a cabinet adapted to contain a milk can provided with a flexible discharge conduit, a dispensing mechanism embodying a walled passage through which the conduit is adapted to extend, the side wall of said passage being provided with a slot through which the conduit may be introduced into the passage to obviate the necessity of threading the conduit through such passage, and a rotatable bushing within the passage and provided with a slot adapted through rotation of the bushing to be moved into and out of registration with the slot of said passage.

18. A milk dispenser according to claim 7 comprising means for closing the slot after the conduit is in place therein.

19. A milk dispenser comprising: a dispensing cabinet provided at its bottom with a milk dispensing mechanism mounted for sliding movement into and out of a guide member permanently supported on the cabinet, said dispensing mechanism being attachable to and removable from the cabinet without the use of tools.

20. An outlet nipple for milk dispensers comprising: a tube of flexible material larger at one end which is open than at the other end, said tube being provided in closely spaced relation to its larger open end with an internal annular bead.

21. A milk dispenser comprising: a cabinet, a milk can within the cabinet, said milk can having a bottom outlet, a flexible nipple one end of which is secured to said outlet while the remainder of the nipple projects through said outlet into the milk containing confines of the can, said nipple being withdrawable to project below the bottom of the can, and valvular mechanism mounted on the cabinet below the can for permitting or arresting the flow of milk from the can through the withdrawn nipple at the will of the operator.

22. A flexible milk outlet nipple one end of which is returned upon itself to provide an annular attaching channel facing in the direction of the length of the nipple and adapted to receive the tubular outlet of a milk can.

23. A milk can provided with an internal milk containing chamber having a tubular outlet at its bottom, a nipple the greater portion of which is positioned within the milk containing chamber of the can, said nipple extending outwardly through the tubular outlet and returned upon itself to embrace the exterior surface of the tubular outlet, and means for detachably binding the returned portion of the nipple to the external surface of said outlet.

References Cited in the file of this patent

UNITED STATES PATENTS

| | | |
|---|---|---|
| 2,134,910 | Dvorak | Nov. 1, 1938 |
| 2,176,513 | Smith | Oct. 17, 1939 |
| 2,377,261 | Norris | May 29, 1945 |
| 2,561,596 | Rieke | July 24, 1951 |
| 2,601,319 | Norris et al. | June 24, 1952 |
| 2,681,747 | Norris et al. | June 22, 1954 |